United States Patent [19]

Napper

[11] Patent Number: 4,588,008
[45] Date of Patent: May 13, 1986

[54] APPARATUS AND METHOD FOR DELIMBING TREE TRUNKS

[76] Inventor: Wallace Napper, Rte. 7, Box 115, International Falls, Minn. 56649

[21] Appl. No.: 757,344

[22] Filed: Jul. 22, 1985

[51] Int. Cl.⁴ .............................................. B27L 1/06
[52] U.S. Cl. .................................................. 144/343
[58] Field of Search ...................... 144/2 Z, 3 D, 343

[56] References Cited

U.S. PATENT DOCUMENTS

| | | | |
|---|---|---|---|
| 3,572,410 | 3/1971 | McElderry | 144/2 Z |
| 3,805,858 | 4/1974 | Morin | 144/2 Z |
| 3,868,981 | 3/1975 | Nadeau | 144/2 Z |
| 3,881,532 | 5/1975 | Jouppi | 144/2 Z |
| 4,067,367 | 1/1978 | Adamson | 144/2 Z |
| 4,147,190 | 4/1979 | Nadeau | 144/2 Z |
| 4,440,202 | 4/1984 | Everett | 144/2 Z |

Primary Examiner—W. D. Bray
Attorney, Agent, or Firm—Merchant, Gould, Smith, Edell, Welter & Schmidt

[57] ABSTRACT

Delimbing apparatus is disclosed. The apparatus includes a frame have a platform with a central slot. A lower cutting bar may be retracted into the slot, while an upper cutting bar may be pivoted away from the lower cutting bar. A vehicle may be driven over the platform between the upper and lower cutting bars to position trees for delimbing. The upper and lower cutting bars are then brought together and the trees are pulled and pushed between the two bars to cut all limbs from the trunks. The apparatus is portable and provides for positioning of wheels between transit and operational configurations. Also, outriggers for providing ramp surfaces for the vehicle to climb to move over the platform include anchors which hold the apparatus to the ground during delimbing.

16 Claims, 7 Drawing Figures

APPARATUS AND METHOD FOR DELIMBING TREE TRUNKS

FIELD OF THE INVENTION

The present invention is directed to an apparatus and method for removing branches from felled trees. The apparatus includes upper and lower bars having knife like edges through which tree trunks are pulled to cut the branches therefrom.

BACKGROUND OF THE INVENTION

During the harvesting of trees, the branches must be removed from the trunks of the trees before the logs can be easily transported and stacked. Efficient harvesting demands rather quick removal of the branches from the trunks. Although delimbing machines for use with a single tree and machines for use with multiple trees are known, the latter machines which can delimb a number of trunks at a time are of most interest.

U.S. Pat. Nos. 3,805,858 and 3,882,913 show a machine mounted on the end of a truck wherein a lower beam protrudes generally horizontally from the rear of the vehicle, while an upper beam is movable pivotally so as to provide for placement of trunks on the lower beam before delimbing. This machine with its two beams pivotally separated like a giant mouth must be backed toward a group of tree trunks held by a second vehicle. When the trunks have been located on the lower beam, the upper beam is lowered and the trunks are pulled between the upper and lower beams. Operation of the machine would seem to be difficult and time consuming due to the procedure required for initially arranging the trunks on the lower beam.

U.S. Pat. No. 4,147,190 shows a delimber whereby a skidder vehicle tows a small group of trees along the ground toward the machine. The skidder passes on the side of the machine which is structurally open. As soon as the skidder has passed, it swings rapidly in the direction of the machine to direct the tree trunks skidding along the ground into the machine. The trunks are pulled up a ramp and between cutter bars. When the cutter bars have been appropriately located with respect to the trunks, a winch on the skidder pulls the trees through the delimbing machine. The problem, it would appear, with this machine is that the ends of the tree trunks must be plowed through the ground and appropriately maneuvered to be pulled into the delimber machine. It would seem that it would be particularly frustrating if some of the tree trunks were properly aligned, while others just missed the machine.

U.S. Pat. No. 4,440,202 shows yet another tree delimber machine wherein the trunk ends are abutted against a stop while the other ends of the trees are maneuvered with a crane into cellular openings in a grid-like cutter. The cutter is moved longitudinally along the tree trunks to slice off the tree limbs. Although this machine can handle several trees at a time, the individual alignment of various trees and the placing of a trunk end in the grid-like cutter would appear to be a time consuming operation.

The common problem with all these delimber machines is the difficulty in initially positioning multiple tree trunks with respect to the machine. The present invention solves that problem and functions otherwise efficiently to delimb numerous trees at once.

SUMMARY OF THE INVENTION

The present invention is directed to apparatus for delimbing tree trunks wherein the apparatus includes a platform with first and second posts rising vertically from opposite ends of the platform. Upper and lower bars extend between the first and second posts and include mechanism for cutting branches from the tree trunks. A retracting mechanism provides for lowering the lower bar into the platform so that a vehicle carrying the tree trunks can drive over the platform. In addition, the apparatus includes a mechanism for separating the upper bar from the lower bar so that the upper bar does not interfere with the vehicle as it goes over the platform. The vehicle moving the tree trunks into position can be driven directly over the platform to position the tree trunks above the lower bar. The lower bar is then movable upwardly to contact the trunks, while the upper bar is movable downwardly to also contact and separate the trunks so that on pulling and pushing by the vehicle, the trunks are delimbed by the cutting mechanisms on the upper and lower bars.

More particularly, the platform includes a slot into which the lower cutter bar may be moved in order to allow the trunk carrying vehicle to drive across the platform. A hydraulic ram powers the movement of the lower bar. The upper cutter bar is slidable and pivotable with respect to the first post which rises vertically from one end of the platform. By sliding and pivoting upwardly, the upper cutter bar is separated sufficiently so that it does not interfere with the tree trunk carrying vehicle as it passes over the platform. A motor driven winch with appropriate cable and pulleys provides the moving mechanism for the upper cutter bar.

A further feature of the present delimbing apparatus is that the apparatus is portable. A pair of wheels are attached to the frame of the apparatus. The wheels are movable between a first position wherein the platform rests on the ground and a second position wherein the platform is supported above the ground on the wheels. Another hydraulic ram provides for the movement between the two positions. An anchoring mechanism holds the platform securely to the ground when the platform is resting on the ground.

These and other features and further advantages and objects obtained by the present invention are explained hereinafter with respect to a preferred embodiment, described in detail hereinafter and with respect to drawings, described briefly herebelow.

DETAILED DESCRIPTION OF THE PREFERRED EMBODIMENT

Figure 1:
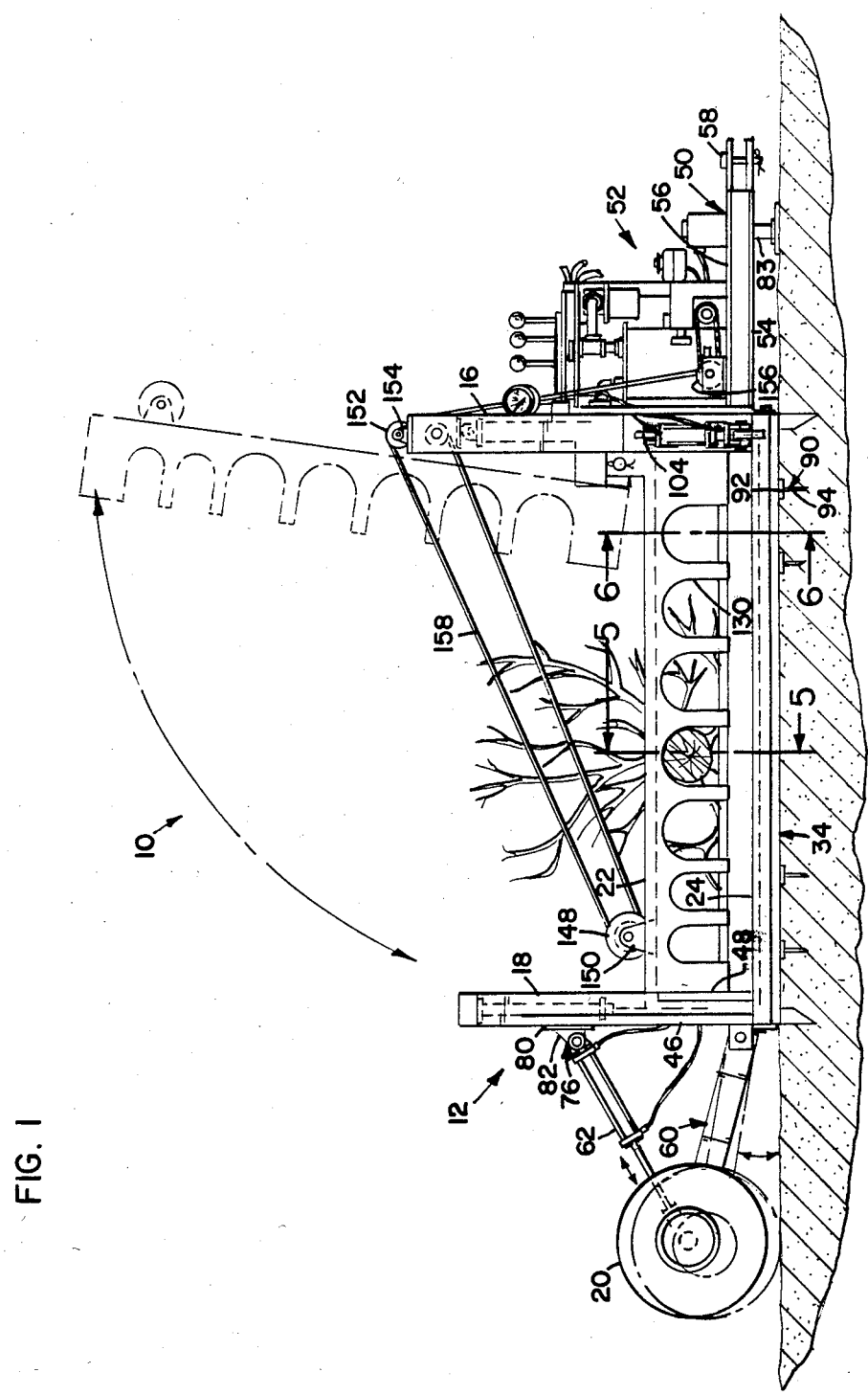
FIG. 1 is a side elevational view of apparatus in accordance with the present invention, showing second positions in phantom lines for some elements.
Figure 2:
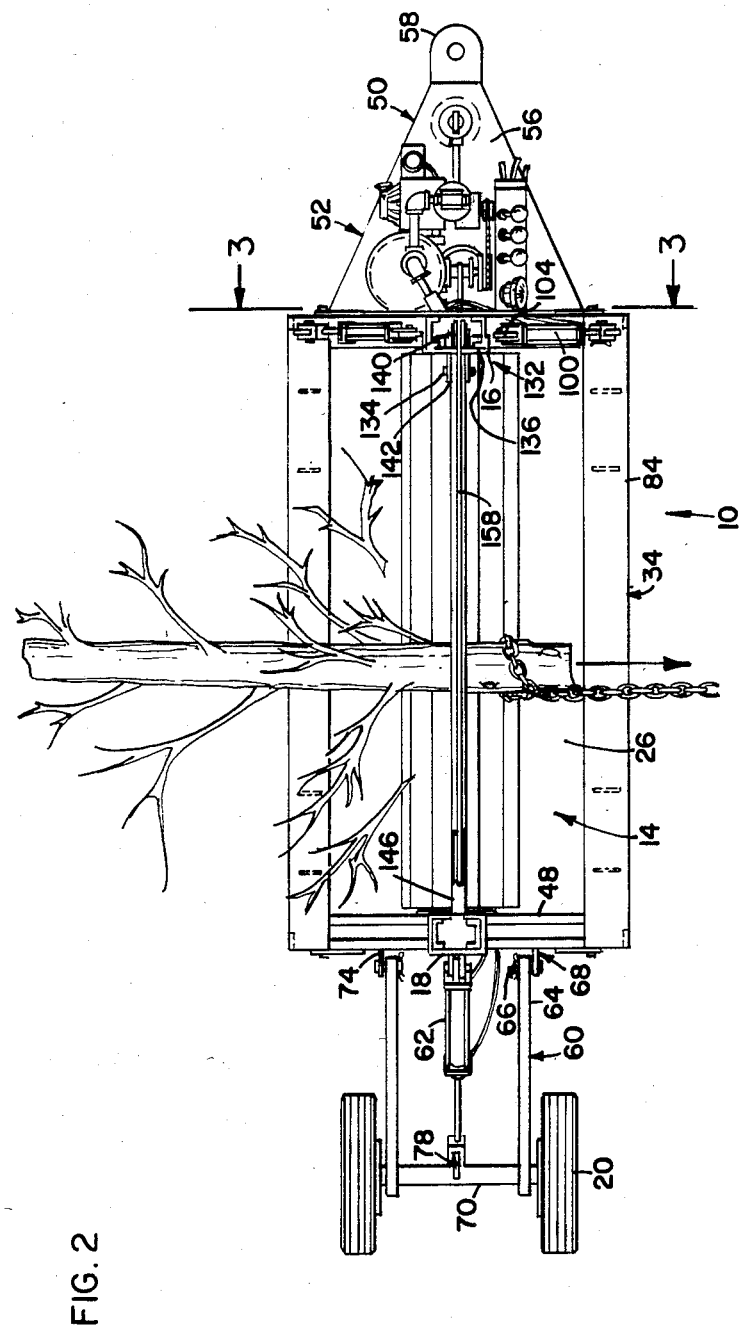
FIG. 2 is a top plan view of the apparatus of FIG. 1.

Referring now to the drawings wherein like reference numerals designate identical or corresponding parts throughout the several views, and more particularly to FIGS. 1 and 2, apparatus for delimbing tree trunks in accordance with the present invention is designated generally by the numeral 10. Apparatus 10 includes a frame 12 having a platform 14 with first and second posts 16 and 18 rising vertically from opposite ends of platform 14. A pair of wheels 20 are attached to the rearend of frame 12 and are movable between a first position wherein platform 14 rests on the ground and a second position wherein platform 14 is supported by wheels 20. Upper and lower cutter bars 22 and 24 separate and guide a plurality of tree trunks as they are pulled through apparatus 10. Upper and lower cutter bars 22 and 24 each preferably include knife edges which cut the branches from the trunks.

Figure 3:
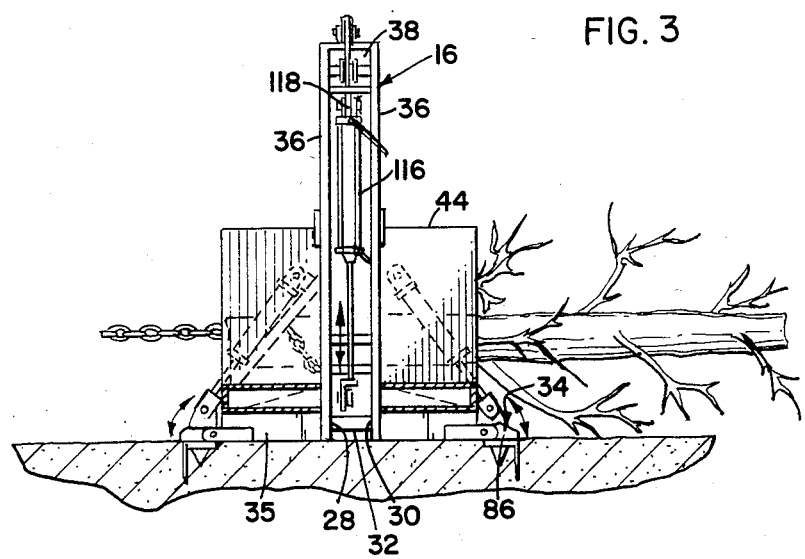
FIG. 3 is a cross-sectional view taken along line 3—3 of FIG. 2.
Figure 4:
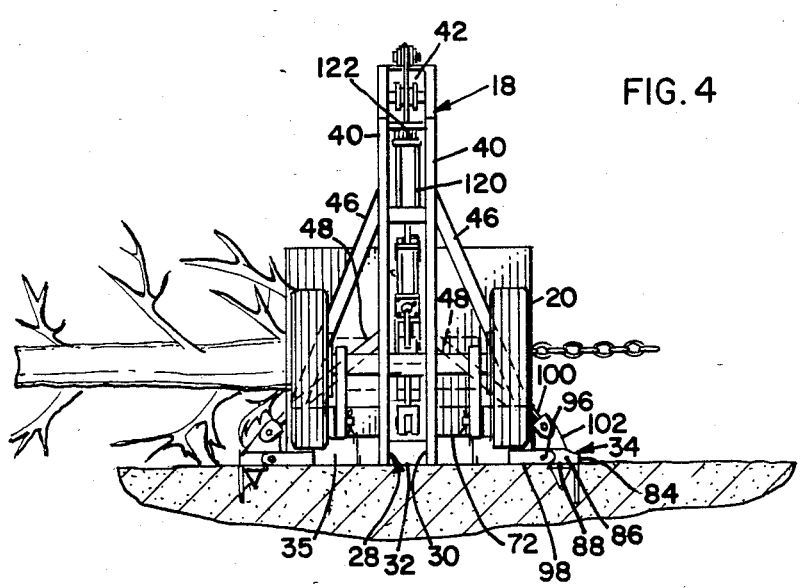
FIG. 4 is an end elevational view showing the end opposite the view of FIG. 3.

Platform 14 is comprised of I-beams or channels (not shown) forming a framework beneath plate 26 (see FIG. 2). As shown in FIGS. 3 and 4, platform 14 includes a centrally located, longitudinal slot 28. Slot 28 has side walls formed by channel or I-beam members 30 and includes a plate 32 extending between the side walls to form a bottom of the slot. Platform 14 may include end members 35. The longitudinal edges of platform 14 may be open or may have a channel or I-beam member (not shown) running therealong. In any case, an outrigger 34 butts against each longitudinal edge of platform 14 to provide a ramp surface for the skidder vehicle to drive onto and off platform 14.

First and second posts 16 and 18 rise vertically from opposite ends of slot 28 in platform 14. First, post 16 is farthest from wheels 20 and is formed from a pair of spaced-apart channel members 36. Channel members 36 are open toward one another and are spaced to form a slot 38 (see FIG. 3) which is centered on slot 28 in platform 14.

Second, post 18 is also formed from a pair of similar channel members 40 (see FIG. 4) which are also oriented with respect to one another in a fashion similar to channel members 36 so as to form a slot 42 also centered on slot 28 of platform 14. The bottom ends of channel members 36 and 40 are welded or otherwise attached to platform 14. Channel members 36 are further supported by wall member 44 which extends outwardly to near the side edges of platform 14 and extends upwardly about one half the height of first post 16. Wall 44 also functions to shield an operator from cut branches.

Channel members 40 of second post 18 are supported by braces 46 and 48. In addition, there are various plates extending between each pair of channel members 36 and 40 to provide for appropriate bracketry for other parts as described hereinafter. It is further understood that different or additional support structure may be used to support first and second ports 16 and 18 with respect to platform 14.

An auxiliary platform 50 for supporting various control and power elements 52 extends outwardly from wall 44 on the opposite side of wall 44 from platform 14. Auxiliary platform 50 may be a part of and simply an extension of platform 14 or, as shown in FIG. 1, auxiliary platform 50 may be separate from platform 14 and at a different elevation than platform 14. Platform 50 also is comprised of channel or I-beam members 54 which form a structure for a top plate 56. Preferably, the end of auxiliary platform 50 includes a hitch 58 so that apparatus 10 may be pulled by a vehicle from place to place.

Wheels 20 are attached to frame 12 for movement between a first position which allows platform 14 to rest on the ground and a second position which helps support platform 14 above the ground. Wheels 20 are mounted to a subframe 60 which is pivotally attached to frame 12 and movable between the first and second wheel positions with a hydraulic piston/cylinder assembly 62. As shown in FIG. 2, subframe 60 includes a pair of spaced-apart struts 64 pivotally attached with pins 66 to brackets 68 at the inboard end and fastened to cross member 70 at the outboard end. Bracket 68 includes a plate 72 (see FIG. 4) attached to and extending upwardly from platform 14. Plate 72 extends outwardly sufficiently far to allow for the spacing of struts 64. Plate 72 is also attached by welding or otherwise to channels 40 of post 18. Ears 74 are welded or otherwise attached to protrude outwardly from plate 72 and include openings for pivotally receiving a pin 66. Each pin 66 has a head at one end and a nut, key or some other retaining mechanism at the other end. Wheels 20 are rotatably attached to cross member 70 in a fashion commonly known for attaching free wheeling wheels. Hydraulic cylinder 62 extends between a bracket 76 attached to post 18 and an ear 78 attached to cross member 70. Bracket 76 includes a plate 80 welded or otherwise attached between channel members 40 and a ear 82 extending outwardly from attachment with plate 80. Bracket 76 is spaced upwardly from bracket 68 so that when hydraulic piston/cylinder assembly 62 contracts, wheels 20 are raised and platform 14 is lowered. Likewise, when hydraulic piston/cylinder assembly 62 is extended, wheels 20 are forced against the ground which causes platform 14 to raise. In this regard, it is desirable to utilize a jack device 83 for attachment to auxiliary platform 50 and located near hitch 58 for raising and lowering the end of platform 14 opposite wheels 20.

Outriggers 34 are located along the opposite side edges of platform 14 and provide a ramp surface for the vehicle pulling the trees to mount and drive off of platform 14. Outriggers 34 also help anchor apparatus 10 to the ground. As shown in FIGS. 1-4, each outrigger 34 includes an upper plate 84 and end walls 86. Also, each outrigger 34 includes a bottom 88 to which a plurality of anchor members 90 are attached. It is understood, of course, that additional framework may be included beneath upper plate 84 and between end walls 86. A bottom wall 88 may not be required depending on the design of particular framework. Anchor members 90 are preferably comprised of a plate 92 welded or otherwise attached to bottom wall 88 and a triangular plate 94 attached similarly to for extending perpendicularly downwardly from plate 92.

Outriggers 34 are pivotally attached at end plates 86 with pins 96 to brackets 98. Brackets 98 are attached to the opposite end plates 35 at opposite side edges. Each bracket 98 is shown as a plate welded or otherwise attached to end plate 35. The plate extends beyond the edge of end plate 35 and has an opening in the extension for receiving pin 96. Pin 96 may be a bolt and nut combination or a similar assembly for holding outrigger 34 to bracket 98 and allowing it to pivot thereabout. Preferably, bracket 98 is located so that pin 96 attaches to outrigger 34 near the upper surface of upper plate 84 so that outrigger 34 is pivotal without interference with a side edge of platform 14.

As shown in FIGS. 1–3, hydraulic piston/cylinder assemblies 100 are pivotally attached between outriggers 34 and first post 16. One end of assembly 100 is pivotally attached with a pin in the usual fashion to a bracket 102 welded or otherwise attached near one end of outrigger 34, while the other end of assembly 100 is similarly pivotally attached to a bracket 104 at a height elevationally above outrigger 34. Bracket 104 is attached to first post 16. When platform 14 is resting on the ground, assemblies 100 are extended to pivot outriggers 34 downwardly to provide a ramp surface from the level of the ground to the upper surface of platform 14. It is noted that platform 14 may also include a partial ramp surface from its side edge to a location nearer slot 28. When apparatus 10 is prepared for transit, assemblies 100 are contracted to pivot outriggers 34, upwardly, preferably before platform 14 is raised from the ground.

Upper and lower cutter bars 22 and 24 extend between first and second posts 16 and 18. Lower cutter bar 24 includes an I-beam 106 which has a width somewhat less than the width of slot 28 and less than the width of slots 38 and 42 formed between channels 36 and channels 40 of first and second posts 16 and 18. Alternatively, lower cutter bar 24 has ends which are sufficiently narrow to fit in slots 38 and 42. A blade 108 is welded or otherwise attached to the top of I-beam 106. Blade 108 extends nearly the entire longitudinal distance between first and second posts 16 and 18. Blade 108 is sharpened to include knife-like edges 110, preferably on both sides. A pair of shields 112 are pivotally extended from opposite sides of the upper member 114 of I-beam 106. Shields 112 extend longitudinally approximately the same distance as blade 108. Shields 112 deflect cut branches away from slot 28 so that I-beam 106 can be lowered unimpededly into it.

A first hydraulic piston/cylinder assembly 116 fits between channels 36 of first beam 16 and extends from attachment at one end of I-beam 106 to the other end for attachment to a bracket 118 attached between channel members 36. Similarly, a second hydraulic piston/cylinder assembly 120 is located between channel members 40 of second post 18 and extends between I-beam 106 and a bracket 122 fastened between channel members 40. Assemblies 116 and 120 extend to lower cutter bar 24 and contract to raise cutter bar 24. Cutter bar 24 may be lowered so that it is almost completely received within slot 28 so that shields 112 extend outwardly along the upper surface of platform 14 and blade 108 is elevated only slightly above shields 112 on top of platform 14. In such a configuration, a vehicle may easily drive over lower cutter bar 24. After the vehicle has passed and the ends of the logs are positioned over lower bar 24, cutter bar 24 is raised until the logs rest on blade 108. Preferably, lower cutter bar 24 is limited in upward movement such that shields 112 are always inclined and in contact with platform 14. In that way, shields 112 should not bind with platform 14 to prevent downward movement of cutter bar 24.

Figure 5:
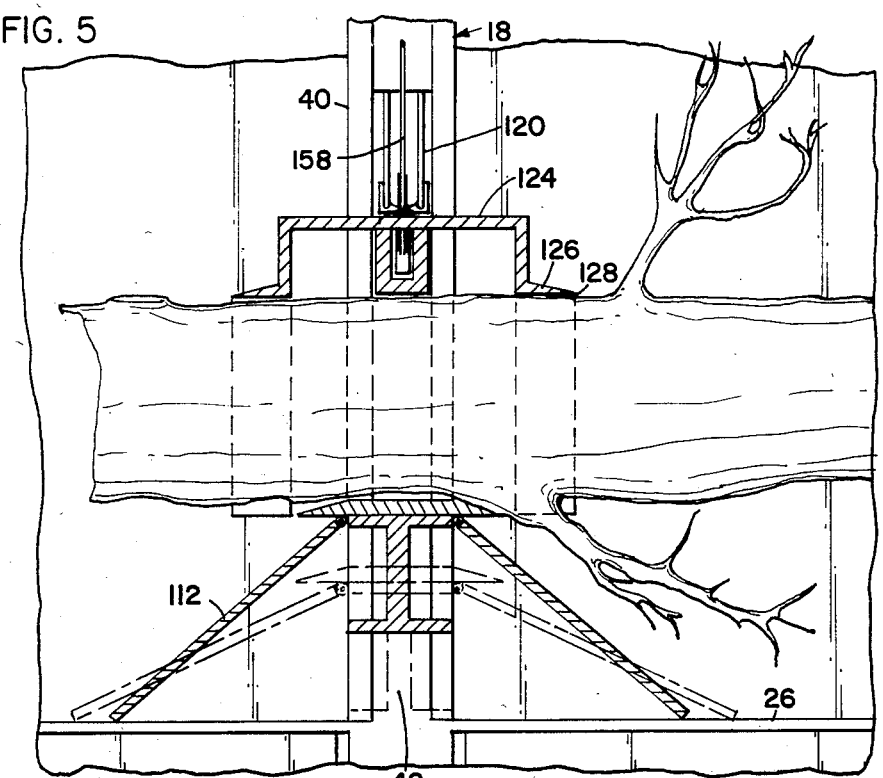
FIG. 5 is a cross-sectional view taken along line 5—5 of FIG. 1.
Figure 6:
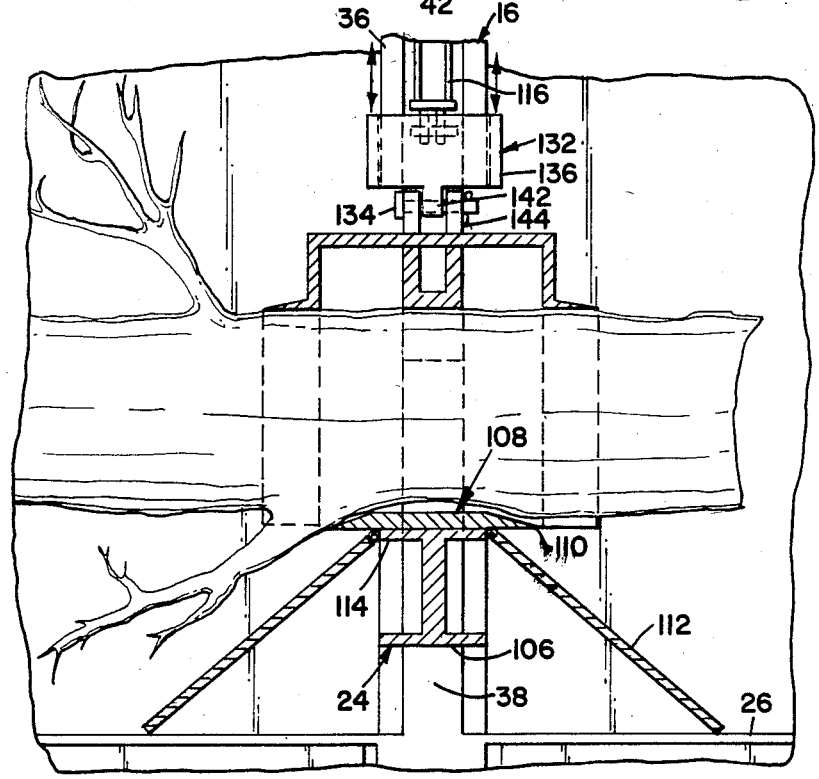
FIG. 6 is a cross-sectional view taken along line 6—6 of FIG. 1.

Upper cutter bar 22 also extends between first and second posts 16 and 18. As shown in FIG. 5, upper cutter bar 22 is an inverted channel member 124. Scalloped blade members 126 are welded or otherwise attached to the downwardly extending sides of channel member 124. Blade members 126 have sufficient length to allow them to cut through branches and sever the branch from the tree trunk before the branch comes into contact with channel member 124. The outward end 128 of blade member 126 is knife-like to provide a cutting edge. Channel member 124 is of sufficient width and the legs 130 (see FIG. 1) extending downwardly from the semi-cylindrical ends of scalloped blades 126 are of sufficient length that the ends of legs 130 fit on either side of lower cutter bar 24. Thus, a tree trunk is placed on lower cutter bar 24 and upper cutter bar 22 is lowered onto the tree trunk. A particular scalloped blade fits about the trunk and extends downwardly past lower blade 108 so that cutting edges completely surround the particular trunk.

As shown in FIGS. 1 and 2, upper cutter bar 22 is pivotally attached to slide assembly 132 at pin 134. Slide assembly 132 includes a channel member 136 for fitting in a snug, but slidable, relationship on first post 16. The base of channel 136 faces post 18, while the legs of channel 136 fit against the bases of channel members 36 of post 16. A pair of angle members 140 are welded or otherwise attached to the inside of base 138. Each angle member extends inwardly and then outwardly toward a leg of channel member 136 so that a slot is formed between one of the legs of angle 140 and base 138 for receiving the inside leg of channel member 36. Slide assembly 132 is sufficiently long to provide stability as it slides along channel members 36 of post 16. A plate 142 is welded or otherwise attached to the base 138 and extends toward post 18. Plate 142 has an opening in it them to receive pin 134. Upper cutter bar 22 also has a pair of plates 144 extending upwardly to receive plate 142 therebetween. Plate 144 has an opening in it for receiving pin 134. Pin 134 is of a type described hereinbefore being either a nut and bolt combination or equivalent.

The end of upper cutter bar 22 opposite slide 132 includes a projection 146 which extends into slot 42 to retain upper cutter bar 22 between first and second posts 16 and 18 when tree trunks are being pulled between upper and lower cutter bars 22 and 24. A pulley 148 is rotatably attached to bracket 150 near the end of upper cutter bar 22 nearest post 18. A second pulley 152 is rotatably attached to a bracket 154 near the top of first post 16. A cable is threaded from a spool 156 attached to auxiliary platform 50. Cable 158 extends from spool 156 over second pulley 152 and around first pulley 148 and back to a fixed attachment to first post 16 just beneath second pulley 152. A hydraulic motor 184 turns spool 156 to wrap cable 158 thereby raising upper cutter bar 22 by pivoting it about pin 134. If upper cutter bar 22 is raised sufficiently, slide 132 may also rise along post 16. Generally, however, slide 132 moves along post 16 only to level upper cutter bar 22 when logs are between upper and lower cutter bars 22 and 24.

Figure 7:
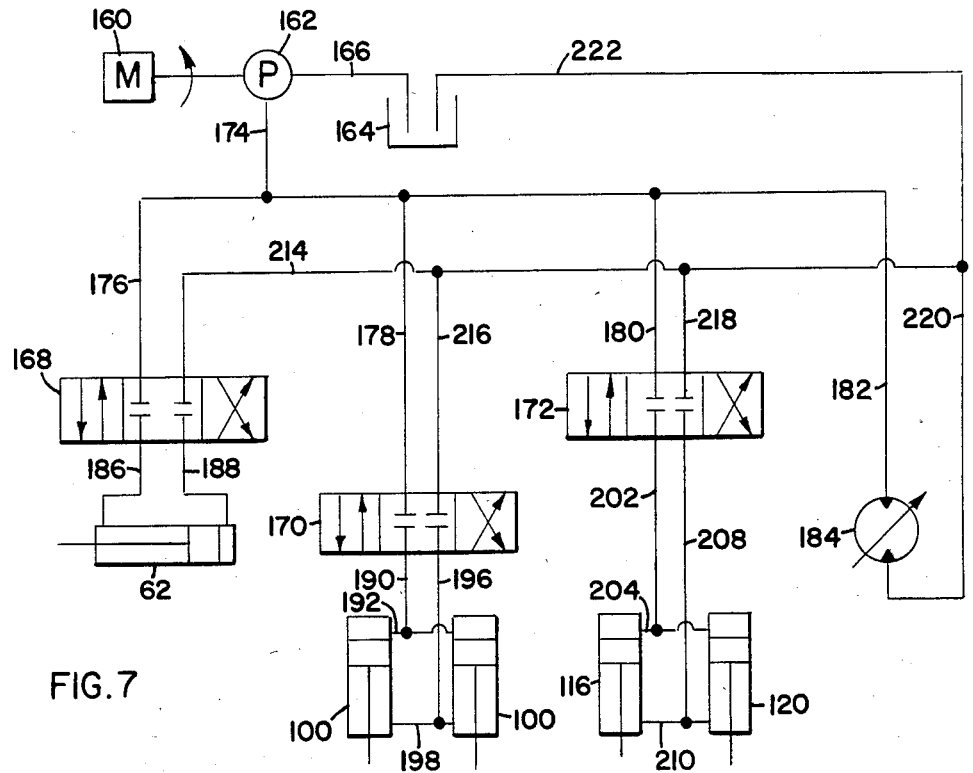
FIG. 7 is a schematic diagram of an hydraulic circuit for the present apparatus.

A schematic for the hydraulic control system of apparatus 10 is shown in FIG. 7. It is understood that other energy mechanisms and appropriate components may be used to drive and control apparatus 10 as well. The schematic of FIG. 7, however, is representative and preferred. A gasoline or other type of motor 160 drives pump 162. Pump 162 is connected to reservoir 164 via fluid line 166. Pump 162 on the outlet side connects to valves 168, 170 and 172 via output fluid line 174 and input fluid lines 176, 178 and 180 to the respective valves. Pump 162 is also connected via output fluid line 174 and fluid line 182 to reversible hydraulic motor 184. Valve 168 controls the position of wheels 20 and is connected to hydraulic piston/cylinder assembly 62 via fluid lines 186 and 188. Valve 170 controls outriggers 34 and is connected to hydraulic piston/cylinder assemblies 100. Inlet line 190 is teed to connect from valve 170 through line 192 to both assemblies 100. Similarly, line 198 leads from the opposite side of both assemblies 100 through a tee to line 196 connected to valve 170.

Valve 172 controls lower cutter bar 24 and is connected to hydraulic piston/cylinder assemblies 116 and 120. Inlet line 202 leads from valve 172 through a tee to line 204 which is connected to assemblies 116 and 120. Similarly, line 210 is connected at the opposite end of assemblies 116 and 120 and is teed to line 208 leading back to valve 172.

Outlet lines 214, 216, 218 and 220 lead from valves 168, 170, 172 and motor 184, respectively, to line 222 which empties into reservoir 164 thereby completing the hydraulic circuit.

In use, apparatus 10 is pulled at hitch 58 to a location near the felled trees. Jack 83 is extended to support the hitch end of apparatus 10 so that the vehicle may be unhitched from apparatus 10.

To configure apparatus 10 for delimbing, hydraulic piston/cylinder assembly 168 is contracted to move wheels 20 from a second position wherein the platform 14 is supported above the ground by wheels 20 to a first position wherein platform 14 rests on the ground. Next, valve 170 is moved to extend hydraulic piston/cylinder assemblies 100 thereby pivoting outriggers 34 downwardly. Anchors 90 are forced into the ground to anchor apparatus 10 to the ground during delimbing. Outriggers 34 are moved sufficiently so that the upper plate 84 of each outrigger 34 forms a ramp surface from the ground to plate 26 of platform 14.

Next, lower bar 24 is retracted into slot 32 of platform 14. This is done by operating valve 172 to extend piston/cylinder assemblies 116 and 120. As lower bar 24 descends, shields 112 slide along plate 26 until they rest approximately parallel with plate 26. Blade 108 is then near plate 26 at the top of platform 14, just above slot 32. Upper bar 22 is next pivoted upwardly. That is, hydraulic motor 184 is functioned to wind cable 158 onto spool 156 thereby pivoting upper bar 22 about pin 134.

A vehicle pulling a plurality of tree trunks end first is now driven between upper and lower bars 22 and 24. The vehicle moves up a first outrigger 34 and across a portion of platform 14 and over a shield 112 and blade 108 to the other shield 112 and the rest of platform 14 before going down the other outrigger 34. When the ends of the tree trunks have been positioned over lower bar 24, the vehicle is stopped.

Lower bar 24 is now raised. Valve 172 is moved to contract piston/cylinder assemblies 116 and 120 thereby moving lower bar 24 upwardly so that the trunks rest on blade 108. Next, upper bar 22 is pivoted downwardly onto the trunks. That is, hydraulic motor 184 is run to unwind cable 158 thereby pivoting upper bar 22 downwardly with respect to lower bar 24. As lower bar 22 is moved, the trunks are separated into the various scalloped portions along blade 126 of upper bar 22. Slide assembly 132 moves either up or down as required so that upper bar 22 rests on the plurality of trunks and still is approximately parallel with lower bar 24. The far end of upper bar 22 fits in slot 42 to hold upper bar 22 between first and second posts 16 and 18 during delimbing.

Apparatus 10 is now configured for delimbing. The trees are pulled by a vehicle. Limbs are cut by knife edge 110 of blade 108 of lower bar 24 and by knife edge 128 of blade 126 of upper bar 22. If some branches are not fully cut after pulling the trees substantially through apparatus 10, vehicle direction is reversed to push the trunks between upper and lower cutter bars 22 and 24. The knife edges on the opposite sides of the blades then cut any remaining branches from the tree trunks. When branches are cut, they fall downwardly and are deflected sidewardly by shields 112. The branches are cleared from between the first and second posts 16 and 18 before a new grouping of trees are pulled into place for delimbing.

To prepare apparatus 10 for transit after delimbing is completed, lower bar 24 is retracted into slot 32, and upper bar 22 is pivoted downwardly to a position near lower bar 24. Outriggers 34 are pivoted upwardly so that anchors 90 are removed from the ground. Wheels 20 are pivoted downwardly to raise platform 14 from the ground. A vehicle is hitched to hitch 58 and jack 83 is raised from the ground.

The convenience of being able to drive the vehicle which pulls a group of trees directly across apparatus 10 between upper and lower bars 22 and 24 is clearly advantageous. Many other more particular advantages and features, as well as details of structure, have been described in detail with respect to the preferred embodiment. It is understood, however, that many equivalents are possible and, consequently, the present invention is limited only by the claims which follow.

What is claimed is:

1. Apparatus for delimbing tree trunks, said trunks being pulled through said apparatus with a vehicle, said apparatus comprising:
   a platform;
   first and second posts rising from opposite ends of said platform;
   upper and lower bars extending between said first and second posts, said upper and lower bars including first and second means for cutting limbs from said trunks;
   means for retracting said lower bar into said platform so that said vehicle can drive over said platform; and
   means for separating said upper bar from said lower bar so that said vehicle can drive over said platform;
   whereby said vehicle can be driven over said platform to position said trunks between said upper and lower bars for delimbing.

2. Apparatus in accordance with claim 1 wherein said retracting means includes a slot in said platform between said posts and means for lowering said lower bar into said slot and for raising said lower bar from said slot.

3. Apparatus in accordance with claim 1 wherein said separating means includes means for raising and lowering said upper bar with respect to said lower bar, said raising and lowering means including means for pivoting said upper bar with respect to one of said first and second posts.

4. Apparatus in accordance with claim 1 including means for anchoring said platform with respect to the ground.

5. Apparatus for delimbing tree trunks, said trunks being pulled through said apparatus with a vehicle, said apparatus comprising:

a frame including a platform and first and second posts attached to rise vertically from first and second opposite ends of said platform;

a pair of wheels attached to said frame;

means for variably positioning said frame and said wheels with respect to one another, said positioning means providing for a first position wherein said platform rests on the ground and a second position wherein said platform is supported above the ground on said wheels, said positioning means including means for anchoring said platform in said first position to the ground;

upper and lower cutter bars extending between said first and second posts, said upper and lower bars including first and second means respectively for cutting limbs from said trunks;

first means for raising and lowering said lower bar with respect to said platform; and second means for raising and lowering said upper bar with respect to said lower bar, said second raising and lowering means including first means for pivoting said upper bar.

6. Apparatus in accordance with claim 5 wherein said platform includes a slot extending at least partially between said posts so that said first raising and lowering means can move said lower bar into and out of said slot.

7. Apparatus in accordance with claim 6 wherein said first raising and lowering means includes an hydraulic ram attached between said frame and said lower bar and means for driving said ram.

8. Apparatus in accordance with claim 5 wherein said second raising and lowering means includes means for sliding said upper bar along said first post, said first pivoting means including means for pivotally attaching said upper bar to said sliding means.

9. Apparatus in accordance with claim 8 wherein said second raising and lowering means further includes a winch with a cable and means for operating said winch to wind and unwind said cable, said second raising and lowering means also including a first pulley attached to said upper bar and a second pulley attached to said first post, said cable being attached to said first post and entrained about said first and second pulleys to extend to said winch.

10. Apparatus in accordance with claim 5 wherein said positioning means includes means pivotally attaching said wheels to said frame and means for pivotally moving said wheels with respect to said frame.

11. Apparatus in accordance with claim 10 wherein said moving means includes an hydraulic ram attached between said frame and said wheels attaching means and means for driving said ram.

12. Apparatus in accordance with claim 5 wherein said second cutting means includes a flat member with a knife edge along at least one side, said trunks resting on said flat member, said knife edge for delimbing said trunks.

13. Apparatus in accordance with claim 12 wherein said first cutting means includes a plurality of generally semi-cylindrical scallops in said upper bar, said scallops separating said trunks and having a knife edge along at least one side, said scallops having elongated ends extending beneath said flat member of said second cutting means when said first and second cutting means are in a cutting configuration.

14. Apparatus for delimbing tree trunks, said trunks being pulled through said apparatus with a vehicle, said apparatus comprising:

a frame including a platform and first and second posts attached to rise vertically from first and second opposite ends of said platform;

a pair of wheels attached to said frame;

means for variably positioning said frame and said wheels with respect to one another, said positioning means providing for a first position wherein said platform rests on the ground and a second position wherein said platform is supported above the ground on said wheels, said positioning means including means pivotally attaching said wheels to said frame, said positioning means further including a first hydraulic ram attached between said frame and said attaching means and first means for driving said first ram, said positioning means also including means for anchoring said platform in said first position to the ground;

upper and lower bars extending between said first and second posts, at least one of said bars including means for guiding and cutting a plurality of said tree trunks, said guiding and cutting means including a plurality of semi-cylindrical scallops with a first knife edge along at least one side, the other of said bars also including means for cutting limbs from said trunks, said cutting means including a flat member with a second knife edge along at least one side, said trunks resting on said flat member, said first and second knife edges for delimbing said trunks;

first means for raising and lowering said lower bar with respect to said platform, said first raising and lowering means including a second hydraulic ram attached between said frame and said lower bar and second means for driving said second ram, said platform including a slot extending between said first and second posts whereby said first raising and lowering means moves said lower bar into and out of said slot; and second means for raising and lowering said upper bar with respect to said lower bar, said second raising and lowering means including means for sliding said upper bar along said first post, said raising and lowering means further including means for pivotally attaching said upper bar to said sliding means, said second raising and lowering means also including a winch with a cable and means for operating said winch to wind and unwind said cable, said second raising and lowering means still further including a first pulley attached to said upper bar and a second pulley attached to said first post, said cable being attached to said first post and entrained about said first and second pulleys to extend to said winch;

whereby said lower bar is lowered by said first raising and lowering means into said slot and said upper bar is raised by said second lowering and raising means by operating said winch with said operating means to pivot said upper bar at said pivoting means, thereby separating said upper and lower bars so that said vehicle may drive therebetween to position said trunks, said lower and upper bars being brought together by said first and second raising and lowering means so that when said vehicle pulls said trunks through said apparatus, the limbs on said trunks are cut by said first and second knife edges.

15. A method of delimbing tree trunks by pulling said trunks with a vehicle through an apparatus having a frame with a platform and first and second posts rising vertically from opposite ends of the platform, said apparatus further including upper and lower bars extending between said posts, at least one of said bars including means for guiding the tree trunks between said upper and lower bars, said upper and lower bars each including means for cutting limbs from said trunks, said apparatus also having means for moving each of bars, said method comprising the steps of:

retracting said lower bar into a slot in said platform;
pivoting said upper bar upwardly with respect to said lower bar;
driving said vehicle over said platform and said lower bar and generally between said upper and lower bars;
raising said lower bar from said slot to contact said trunks;
pivoting said upper bar downwardly to contact said trunks;
pulling said trunks with said vehicle between said upper and lower cutter bars to delimb said trunks.

16. The method in accordance with claim 15 including reversing vehicle direction and pushing said trunks between said upper and lower cutter bars.

* * * * *